United States Patent
Kumar et al.

(10) Patent No.: US 8,467,610 B2
(45) Date of Patent: Jun. 18, 2013

(54) VIDEO SUMMARIZATION USING SPARSE BASIS FUNCTION COMBINATION

(75) Inventors: Mrityunjay Kumar, Rochester, NY (US); Zheshen Wang, Tempe, AZ (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 434 days.

(21) Appl. No.: 12/908,022

(22) Filed: Oct. 20, 2010

(65) Prior Publication Data

US 2012/0099793 A1    Apr. 26, 2012

(51) Int. Cl.
G06K 9/46    (2006.01)

(52) U.S. Cl.
USPC .......................................................... 382/195

(58) Field of Classification Search
None
See application file for complete search history.

(56) References Cited

U.S. PATENT DOCUMENTS

| | | |
|---|---|---|
| 6,751,776 B1 | 6/2004 | Gong |
| 7,110,458 B2 | 9/2006 | Divakaran et al. |
| 7,127,120 B2 | 10/2006 | Hua et al. |
| 7,333,712 B2 | 2/2008 | Jeannin et al. |
| 7,630,562 B2 | 12/2009 | Gong et al. |

OTHER PUBLICATIONS

Dong, Zilong, et al. "Keyframe-based real-time camera tracking." Computer Vision, 2009 IEEE 12th International Conference on. IEEE, 2009.*
Peng et al., "Keyframe-based video summarization using visual attention clue," IEEE Multimedia, vol. 17, pp. 64-73 (2010).
Bruckstein et al., "From Sparse Solutions of Systems of Equations to Sparse Modeling of Signals and Images," SIAM Review, pp. 34-81 (2009).
Wang et al., "Human Activity Encoding and Recognition Using Low-level Visual Features," Proceedings of the 21st International Joint Conference on Artificial Intelligence, pp. 1876-1882 (2009).
Xiao et al., "SUN Database: Large-scale Scene Recognition from Abbey to Zoo," IEEE Conference on Computer Vision and Pattern Recognition, pp. 3485-3492 (2010).
Romdhani et al., "Computationally Efficient Face Detection," Proceedings of the 8th International Conference on Computer Vision, pp. 695-700 (2001).
Liu et al.,"Noise Estimation from a Single Image," IEEE Conference on Computer Vision and Pattern Recognition, pp. 901-908 (2006).
Ferzli et al., "A No-Reference Objective Image Sharpness Metric Based on Just-Noticeable Blur and Probability Summation," IEEE International Conference on Image Processing, vol. III, pp. 445-448 (2007).

(Continued)

*Primary Examiner* — Stephen R Koziol
*Assistant Examiner* — Raphael Schwartz
(74) *Attorney, Agent, or Firm* — Kevin E. Spaulding

(57) ABSTRACT

A method for determining a video summary from a video sequence including a time sequence of video frames, comprising: defining a global feature vector representing the entire video sequence; selecting a plurality of subsets of the video frames; extracting a frame feature vector for each video frame in the selected subsets of video frames; defining a set of basis functions, wherein each basis function is associated with the frame feature vectors for the video frames in a particular subset of video frames; using a data processor to automatically determine a sparse combination of the basis functions representing the global feature vector; determining a summary set of video frames responsive to the sparse combination of the basis functions; and forming the video summary responsive to the summary set of video frames.

13 Claims, 6 Drawing Sheets

OTHER PUBLICATIONS

Omidyeganeh M et al: Autoregressive Video Modeling through 2D Wavelet Statistics:, Intelligent Information Hiding and Multimedia Signal Processing (IIH-MSP), 2010 Sixth International Conference on, IEEE, Piscataway, NJ, USA, Oct. 15, 2010, pp. 272-275, XP031803555, ISBN: 978-1-4244-8378-5; abstract; section I, paragraph 1; section II, paragraph 2; section III-section V.B., paragraph 1; figures 2,5.

Wang et al., "Video summarization by redundancy removing and content ranking," Proceedings of the 15th International Conference on Multimedia, pp. 577-580 (2007).

Lee et al., "Efficient Sparse Coding Algorithms," Proc. 19th Annual Conference Neural Information Processing Systems, pp. 801-808 (2007).

* cited by examiner

VIDEO SUMMARIZATION USING SPARSE BASIS FUNCTION COMBINATION

FIELD OF THE INVENTION

This invention relates generally to the field of video understanding, and more particularly to a method to summarize digital video using sparse signal representation.

BACKGROUND OF THE INVENTION

With the development of digital imaging and storage technologies, video clips can be conveniently captured by consumers using various devices such as camcorders, digital cameras or cell phones and stored for later viewing. However, efficient browsing, indexing and retrieval become big challenges for such massive visual data. Video summarization holds the promise to solve this problem by reducing the temporal redundancy and preserving only visually or semantically important parts of the original video.

Video summarization is an active research area and several approaches for generating a video summary from an input video have been proposed. For example, the method disclosed by Jeannin et al. in U.S. Pat. No. 7,333,712, entitled "Visual summary for scanning forwards and backwards in video content" first extracts key frames from the input video and assigns a set of weights to the extracted key frames. A visual summary is then generated by filtering the key frames according to the relative weights assigned to these key frames.

In U.S. Pat. No. 7,110,458, entitled "Method for summarizing a video using motion descriptors", Divakaran et al. teach a method for forming a video summary that measures an intensity of motion activity in a compressed video and uses the intensity information to partition the video into segments. Key frames are then selected from each segment. The selected key frames are concatenated in temporal order to form a summary of the video.

Peng et al., in the article "Keyframe-based video summarization using visual attention clue" (IEEE Multimedia, Vol. 17, pp. 64-73, 2010), teach computing visual attention index (VAI) values for the frames of a video sequence. The frames with higher VAI values are selected as key frames. A video summary is generated by controlling the key frame density.

Another method taught by Wang et al., in the article "Video summarization by redundancy removing and content ranking" (Proceedings of the 15th International Conference on Multimedia, pp. 577-580, 2007), detects shot boundaries by color histogram and optical-flow motion features and extracts key frames in each shot by a leader-follower clustering algorithm. Then, a video summary is generated by key frame clustering and repetitive segment detection.

All of the above approaches for video summarization rely on identifying key frames. These approaches are limited because their performance depends on the accuracy of the underlying key frame extraction algorithms.

In U.S. Pat. No. 7,630,562, entitled "Method and system for segmentation, classification, and summarization of video images," Gong et al., teaches mapping a feature representation of a sequence of video frames into a refined feature space using singular value decomposition. The information contained in each video shot is computed by using a metric in the refined feature space, which in turn is used to generate a summary video sequence. However, singular value decomposition is susceptible to the noise and the non-linearity present in the data.

U.S. Pat. No. 7,127,120 to Hua et al., entitled "Systems and methods for automatically editing a video," teaches a sub-shots based method for video summarization. In this method, first sub-shots from a video are extracted and then a group of sub-shots are discarded using importance measures assigned to these sub-shots. A final video summary is generated by connecting the remaining sub-shots with respective transitions.

U.S. Pat. No. 6,751,776 to Gong, entitled "Method and apparatus for personalized multimedia summarization based upon user specified theme," teaches an approach that uses both natural language processing and video analysis techniques to extract important keywords from the closed caption text as well as prominent visual features from the video footage. The extracted keywords and the visual features are used to summarize the video content that is able to create personalized multimedia summary based on the user-specified theme. But this approach is not suitable for the videos that do not contain closed caption text.

There remains a need for a video summary framework that is data adaptive, robust to noise and different content, and can be applied to wide varieties of videos.

SUMMARY OF THE INVENTION

The present invention represents a method for determining a video summary from a video sequence including a time sequence of video frames, comprising:

a) defining a global feature vector representing the entire video sequence;

b) selecting a plurality of subsets of the video frames;

c) extracting a frame feature vector for each video frame in the selected subsets of video frames;

d) defining a set of basis functions, wherein each basis function is associated with the frame feature vectors for the video frames in a particular subset of video frames;

e) using a data processor to automatically determine a sparse combination of the basis functions representing the global feature vector;

f) determining a summary set of video frames responsive to the sparse combination of the basis functions; and g) forming the video summary responsive to the summary set of video frames.

The present invention has the advantage that a video summary is determined from a video sequence without the need to first determine a set of key frames.

It has the additional advantage that it can incorporate low-level video image quality information such as blur, noise and sharpness, as well as high-level semantics information such as face detection, motion detections and semantic classifiers.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
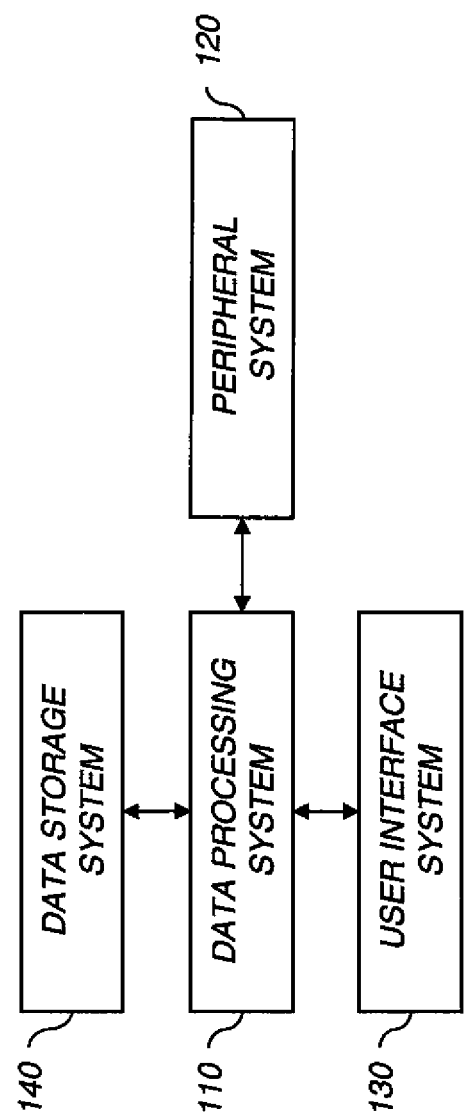
FIG. 1 is a high-level diagram showing the components of a system for summarizing digital video according to an embodiment of the present invention.

FIG. 1 is a high-level diagram showing the components of a system for image retargeting according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-6 described herein. The phrases "data processing device" or "data processor" are intended to include any data processing device, such as a central processing unit ("CFU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-6 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
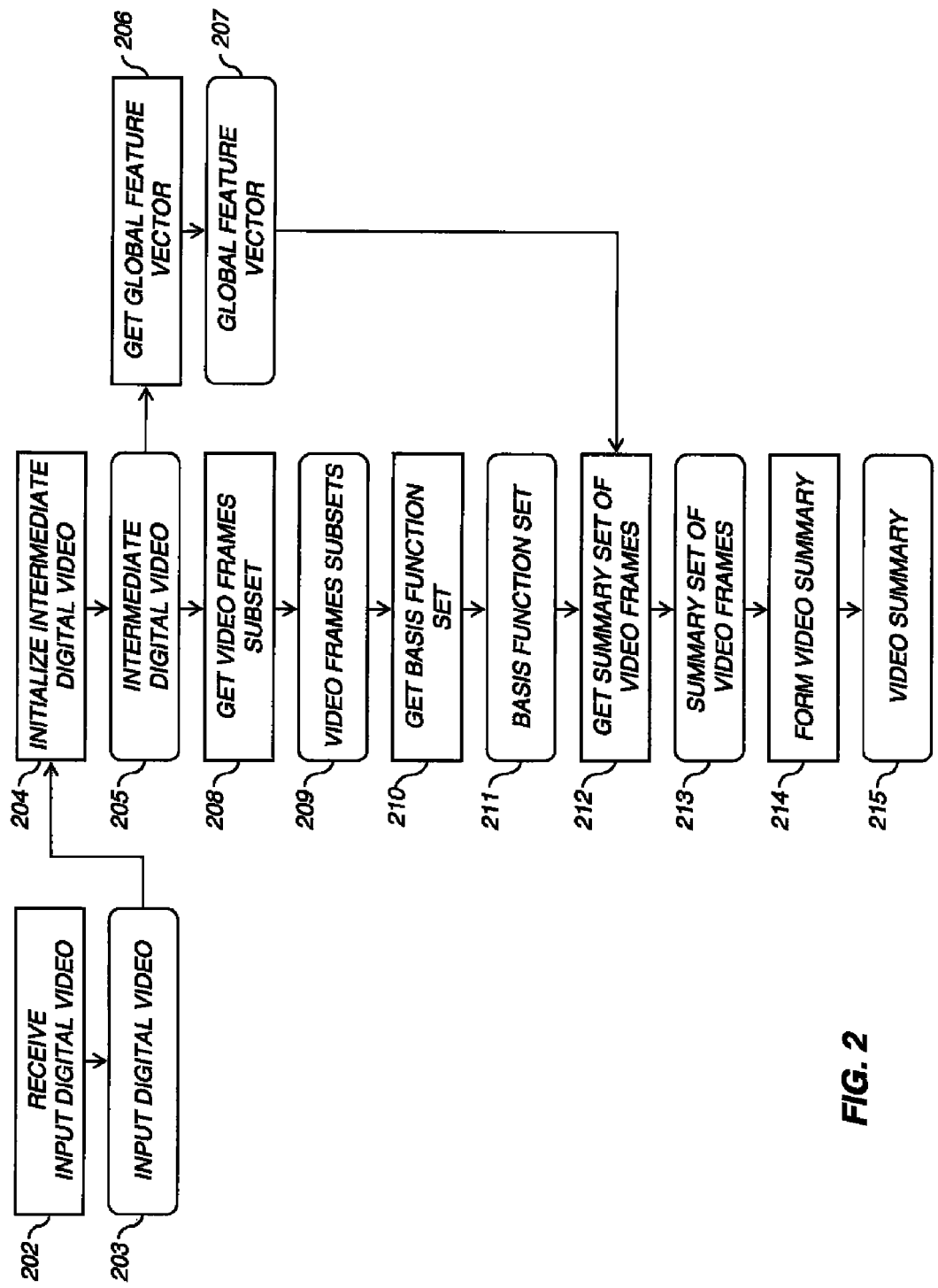
FIG. 2 is a flow diagram illustrating a method for summarizing digital video according to an embodiment of the present invention.

FIG. 2 is a flow diagram illustrating a method for generating a summary video according to an embodiment of the present invention. An input digital video 203 representing a video sequence captured of a scene is received in a receive input digital video step 202. The video sequence includes a time sequence of video frames. The input digital video 203 can be captured using any video capture device known in the art such as a video camera or a digital still camera with a video capture mode, and can be received in any digital video format known in the art.

An initialize intermediate digital video step 204 is used to initialize an intermediate digital video 205. The intermediate digital video 205 is a modified video estimated from the input digital video 203.

A get global feature vector step 206 uses the intermediate digital video 205 to produce a global feature vector 207. The global feature vector 207 represents the spatio-temporal features of the entire intermediate digital video 205.

A get video frames subset step 208 selects a plurality of subsets of the video frames from the intermediate digital video 205 to produce a set of video frames subsets 209. Each video frame subset 209 represents a candidate set of video frames selected to be representative of the video frames within the intermediate digital video 205. More details of the get video frames subset step 208 will be discussed later with reference to FIG. 3.

A get basis function set step 210 determines a set of basis functions collected in a basis function set 211 responsive to the video frames subsets 209. More details of the get basis function set step 210 will be discussed later with reference to FIG. 6.

A get summary set of video frames step 212 uses the basis function set 211 and the global feature vector 207 to determine a summary set of video frames 213. Finally, a form video summary step 214 uses the summary set of video frames 213 to produce a video summary 215.

The individual steps outlined in FIG. 2 will now be described in greater detail. The initialize intermediate digital video step 204 is a preprocessing step that preprocesses the input digital video 203 to produce the intermediate digital video 205. The intermediate digital video 205 is more suitable for the subsequent steps carried out to produce the video summary 215. The intermediate digital video 205 can be generated in any appropriate way known to those skilled in the art. In a preferred embodiment of the present invention, the intermediate digital video 205 is produced by downsampling each frame of the input digital video 203 by a factor of 2× in both the horizontal and vertical directions and only retaining every $5^{th}$ frame of the input digital video 203.

The get global feature vector step 206 uses the intermediate digital video 205 to produce the global feature vector 207. The global feature vector 207 represents the global spatio-temporal characteristics of the intermediate digital video 205. The global feature vector 207 can be estimated in any appropriate way known to those skilled in the art. In a preferred embodiment of the present invention, the get global feature vector step 206 extracts a visual features vector for each frame of the intermediate digital video 205 and then stacks all the visual features vectors to produce the global feature vector 207. Each visual features vector contains parameters related to video frame attributes such as color, texture, edge orientation present in a frame. Examples of particular visual features would include: color histogram, histogram of oriented edges, GIST features, dense SIFT features, and sparse SIFT histograms as described by Xiao et al. in "SUN Database: Large-scale Scene Recognition from Abbey to Zoo" (IEEE Conference on Computer Vision and Pattern Recognition, pp. 3485-3492, 2010).

The get video frames subset step 208 of FIG. 2 is used to select a plurality of video frame subsets 209 from the intermediate digital video 205, wherein temporal order is preserved within each of the video frame subsets 209. To produce more than one video frames subset 209 from the intermediate digital video 205, the get video frames subset step 208 is repeated until the desired number of video frame subsets 209 are produced. For example, let N be the desired number of video frame subsets 209, then the get video frames subset step 208 is repeated N times to produce N video frames subsets 209. The number N can be determined in any appropriate way known to those skilled in the art. In a preferred embodiment, the value of N is set greater than or equal to the size of the global feature vector 207.

Figure 3:
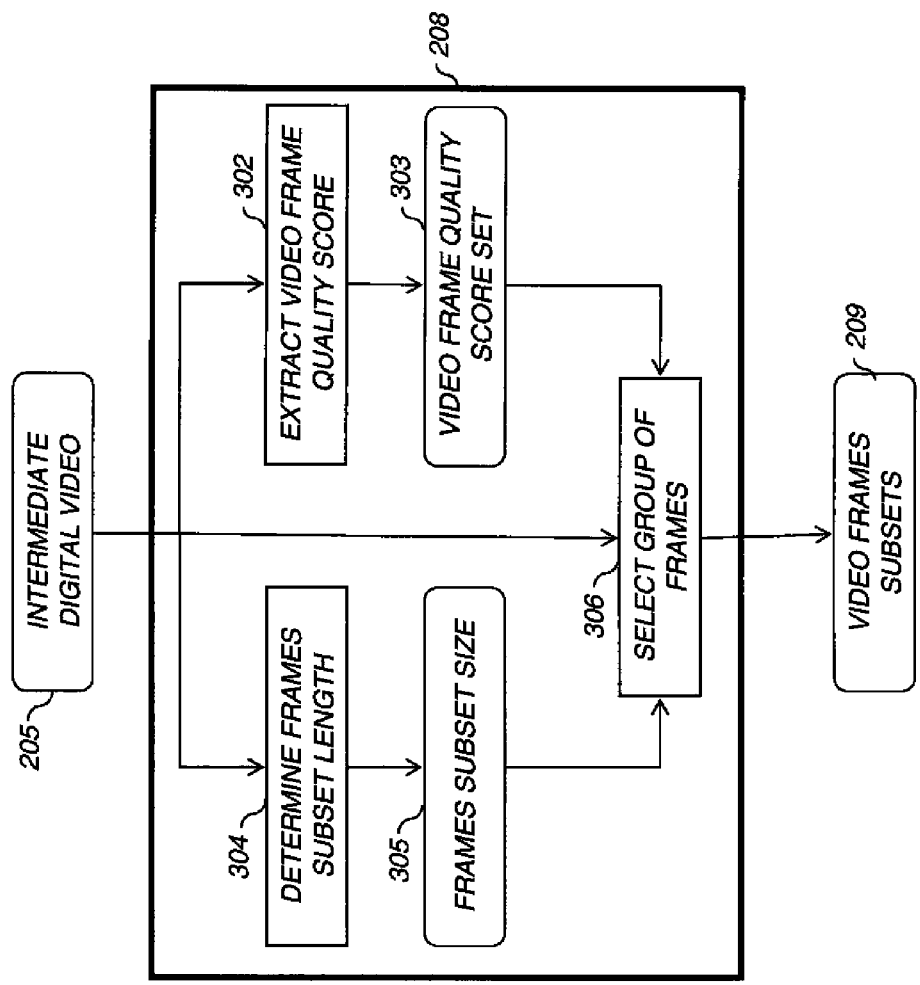
FIG. 3 is a block diagram showing a detailed view of the get video frames subset step of FIG. 2.

FIG. 3 is a more detailed view of the get video frames subset step 208 according to a preferred embodiment of the present invention. In an extract video frame quality score step 302, a visual quality score for each frame in the intermediate digital video 205 is estimated. The visual quality score for a video frame can be determined in any appropriate way known to those skilled in the art. In a preferred embodiment of the present invention, the quality score for a video frame is determined by analyzing the video frame to determine one or more quality attributes. Examples of determining quality attributes would include detecting the presence of one or more faces in the video frame, estimating a noise level for the video frame, or estimating a sharpness level for the video frame. Method for determining these and other quality attributes are well-known in the art. For example, a method for detecting faces in a digital image is described by Romdhani et al. in the article "Computationally Efficient Face Detection" (Proceedings of the $8^{th}$ International Conference on Computer Vision, pp. 695-700, 2001); a method for estimating noise in a digital image is described by Liu et al. in the article "Noise Estimation from a Single Image" (IEEE Conference on Computer Vision and Pattern Recognition, pp. 901-908, 2006); and a method for estimating a sharpness level for a digital image is described by Ferzli et al. in the article "A No-Reference Objective Image Sharpness Metric Based on Just-Noticeable Blur and Probability Summation" (IEEE International Conference on Image Processing, Vol. III, pp. 445-448, 2007). Other examples of attributes that would be related to image quality would include detecting rapid motion changes and classifying the video frames using semantic classification algorithms. When a plurality of quality attributes are determined for a given frame, they can be combined using any method known in the art to determine the visual quality score for the frame. For example, the quality attributes can be combined using a weighted summation. The visual quality scores determined for each frame of the intermediate digital video 205 computed at the extract video frame quality score step 302 are collected into a video frame quality score set 303.

A determine frames subset size step 304 computes a frames subset size 305 responsive to the intermediate digital video 205. The value of the frames subset size 305 represents the number of frames that will be included in each of the video frames subsets 209. The frames subset size 305 can be estimated in any appropriate way known to those skilled in the art. In one embodiment of the present invention, the intermediate digital video 205 is segmented into visually dissimilar groups of frames (e.g., different video scenes) and the value of the frames subset size 305 is set equal to the number of visually dissimilar groups. In another embodiment of the present invention, a set of key frames are identified for the intermediate digital video 205, and then the value of the frames subset size 305 is set equal to the number of key frames. The key frames can be identified in any appropriate way known to those skilled in the art. In some embodiments, the key frames are selected by manually evaluating the intermediate digital video 205 and selecting the most representative frames. In other embodiments an automatic key frame extraction algorithm can be used to identify the key frames. For example, U.S. Patent Application Publication 2007/0183497, by Luo et al., which is incorporated herein by reference, discloses a method of selecting video key frames based on a characterization of the motion in the video, as calculated by digital motion estimation techniques.

A select group of frames step 306 uses the frames subset size 305, the intermediate digital video 205, and the video frame quality score set 303 to select a video frames subset 209 from the intermediate digital video 205, wherein the size of the each video frames subset 209 is equal to the frames subset size 305. The select group of frames step 306 can use any way known to those skilled in the art to select a subset of the video frames from the intermediate digital video 205. In one embodiment, a subset of the video frames is selected by randomly sampling video frames from the intermediate digital video 205, while preserving the temporal order. In another embodiment, the select group of frames step 306 uses the video frame quality score set 303 during the random sampling process to select the video frames subset 209, wherein video frames having higher quality scores are preferentially selected to be included in the video frames subset 209.

Figure 4:
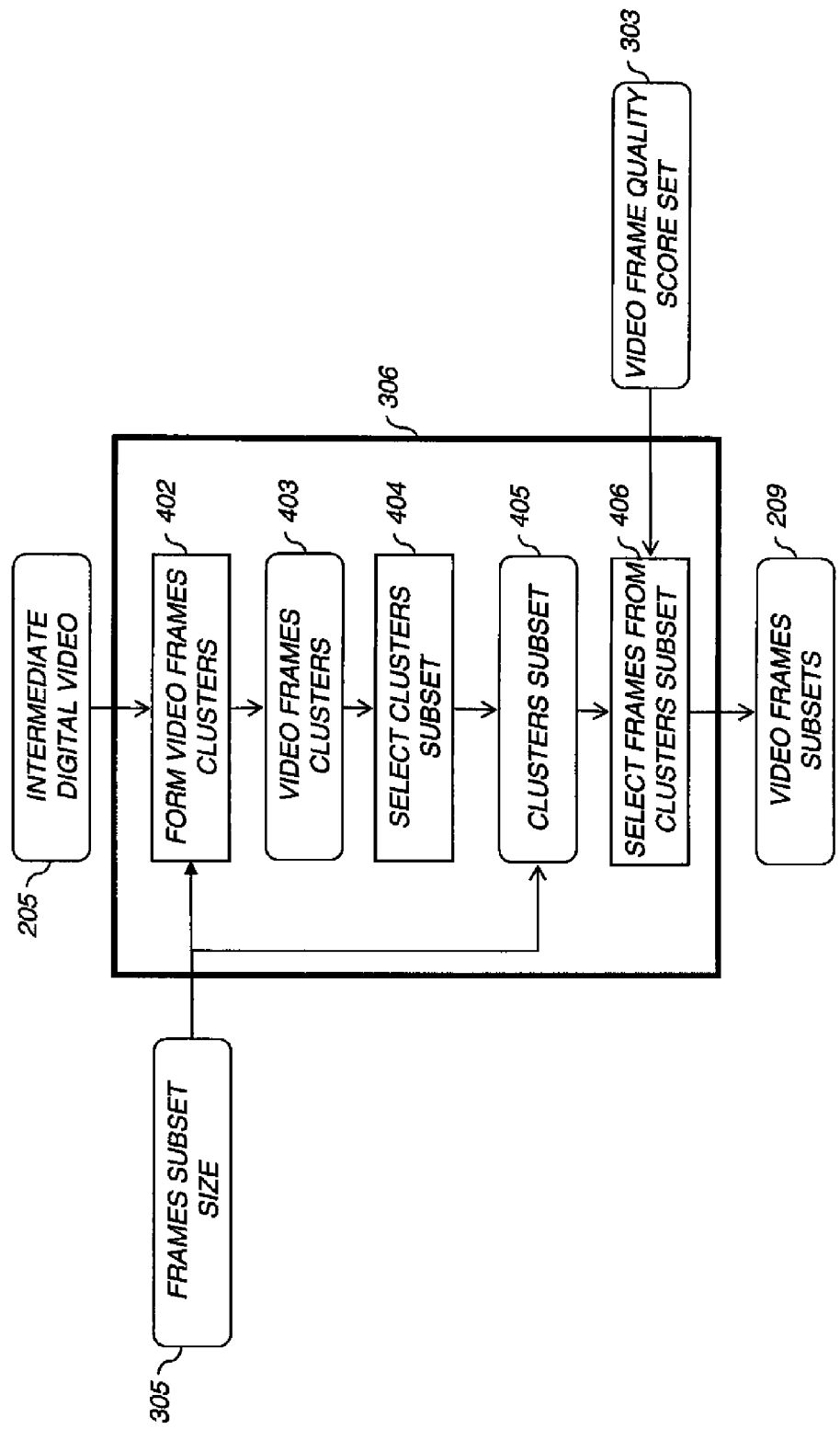
FIG. 4 is a block diagram showing a detailed view of the select group of frames step of FIG. 3.

FIG. 4 is a more detailed view of the select group of frames step 306 shown in FIG. 3 according to a preferred embodiment of the present invention. A form video frames clusters step 402 uses the intermediate digital video 205 and the frames subset size 305 to cluster the video frames of the intermediate digital video 205 into groups of similar frames to produce a set of video frames clusters 403. In a preferred embodiment, the number of video frame clusters, K, formed at the form video frames clusters step 402 is selected to be greater than the value of the frames subset size 305.

Figure 5:
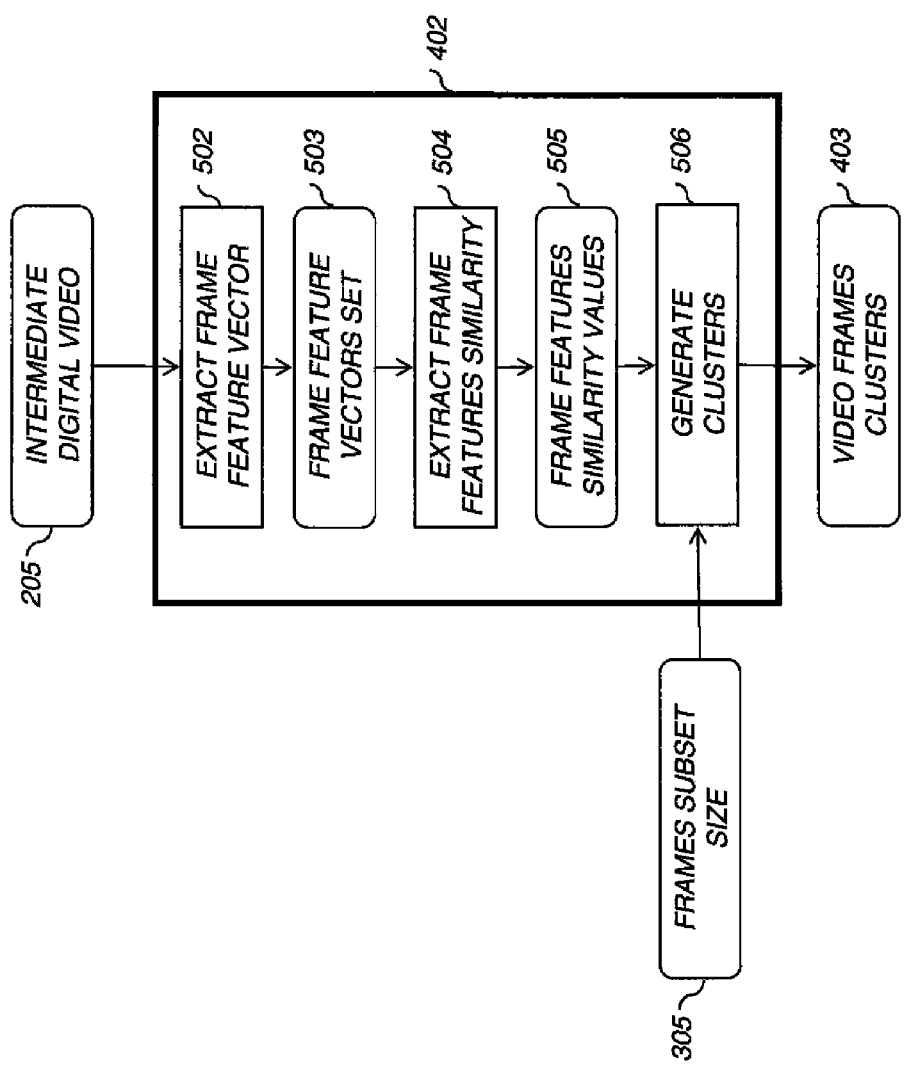
FIG. 5 is a block diagram showing a detailed view of the form video frames clusters step of FIG. 4.

FIG. 5 is a more detailed view of the form video frames clusters step 402 according to a preferred embodiment of the present invention. An extract frame feature vector step 502 extracts visual features for all the frames in the intermediate digital video 205 to produce a frame feature vectors set 503. An extract frame features similarity step 504 computes the similarity of the visual features to determine frame features similarity values 505 responsive to the frame feature vectors set 503. The frame features similarity values 505 can be computed in any appropriate way known to those skilled in the art. In a preferred embodiment of the present invention, a Euclidean distance is determined between the frame features vectors for pairs of frames to compute frame features similarity values 505 which can be represented as a pair-wise similarity matrix. A generate clusters step 506 determines the video frames clusters 403 responsive to the frame features similarity 505 and the frames subset size 305. In a preferred embodiment, the generate clusters step 506 applies the well-known spectral clustering technique on the frame features similarity values 505 to determine the video frames clusters 403, wherein the number of video frame clusters 403 (K) is preferably greater than the value of the frames subset size 305.

Returning now to a discussion of FIG. 4, a select clusters subset step 404 selects L video frame clusters out of the K video frames cluster 403 to produce a clusters subset 405, wherein L is the value of the frames subset size 305. The clusters subset 405 can be determined in any appropriate way known to those skilled in the art. In a preferred embodiment, the clusters subset 405 is determined by randomly selecting L video frames clusters (without repetition) from the video frames clusters 403.

A select frames from clusters subset step 406 selects one video frame from each of the L video frame clusters in the clusters subset 405 to determine the video frames subset 209. The select frames from clusters subset step 406 can use any way known to those skilled in the art to determine a subset of the video frames for the video frames subset 209. In a preferred embodiment, the select frames from clusters subset step 406 selects the video frame preferentially according to the video quality score (per the video frame quality score set 303).

Figure 6:
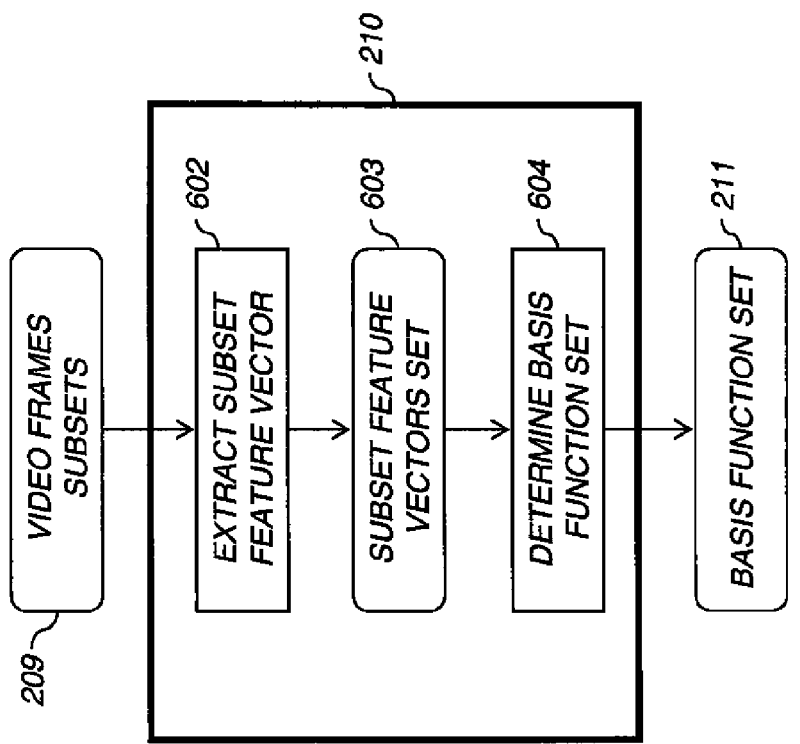
FIG. 6 is a block diagram showing a detailed view of the get basis function set step of FIG. 2.

The get basis function set step 210 in FIG. 2 determines a set of basis functions stored in the basis function set 211 responsive to the video frames subsets 209. The get basis function set step 210 can use any appropriate way known to those skilled in the art to determine the basis function set 211. FIG. 6 is a more detailed view of the get basis function set step 210 shown in FIG. 2 according to a preferred embodiment of the present invention. In this arrangement, an extract subset feature vector step 602 extracts the visual feature vectors for all the frames of all the subsets of the video frames contained in the video frames subsets 209. As discussed earlier, visual feature vectors contain parameters related to the video frame attributes such as color, texture, edge orientation present in a frame. Examples of particular visual features would include: color histogram, wavelet coefficients, GIST features, SIFT features, and SIFT features with spatial pyramid matching. The visual feature vectors extracted at the extract subset feature vector step 602 are collected into a subset feature vectors set 603.

A determine basis function set step 604 produces the basis function set 211 responsive to the subset feature vectors set 603. In a preferred embodiment of the present invention, the basis function set 211 is a matrix, wherein each column of the basis function set 211 is a basis function computed at the basis function set step 604 by concatenating the visual feature vectors of all the frames of the corresponding subset of the video frames in the subset feature vectors set 603.

Returning to a discussion of FIG. 2, the get summary set of video frames step 212 uses the basis function set 211 and the global feature vector 207 to determine the summary set of video frames 213. The summary set of video frames 213 can be determined in any appropriate way known to those skilled in the art. In a preferred embodiment of the present invention, a sparse combination of the basis functions of the basis function set 211 is determined to represent the global feature vector 207. The summary set of video frames 213 is then determined responsive to the sparse combination of the basis functions as explained next.

In equation form, the representation the global feature vector 207 using a sparse combination of the basis functions of the basis function set 211 can be expressed by:

$$y = A\alpha \qquad (1)$$

where y is the value of the global feature vector 207, A is the matrix representation of the basis function set 211, and $\alpha$ is a sparse vector of weighting coefficients where only a minority of the elements of $\alpha$ are non-zero.

Due to the sparse nature of $\alpha$, the linear combination in Eq. (1) is called a sparse combination. Mathematical algorithms for determining sparse combinations are well-known in the art. An in-depth analysis of sparse combination, its mathematical structure and relevancy can be found in the article entitled "From Sparse Solutions of Systems of Equations to Sparse Modeling of Signals and Images," (SIAM Review, pp. 34-81, 2009) by Bruckstein et al. The summary set of video frames 213 is determined by collecting the subset of the video frames corresponding to those columns of A that are associated to the non-zero values of $\alpha$.

The weighting coefficients $\alpha$ for the sparse combination can be estimated in any appropriate way known to those skilled in the art. In a preferred embodiment of the present invention, $\alpha$ is estimated using a weighted-sequence kernel function. This is done by finding the $\alpha$ that minimizes the expression:

$$D(y, A\alpha) \qquad (2)$$

subject to the constraint $\|\alpha\|_0 < m$, where $\|\cdot\|_0$ denotes $l_0$ norm, m is the number of non-zero elements in $\alpha$, and $D(\cdot)$ is a dissimilarity function which returns a number that represents the dissimilarity between its two arguments. For any given $D(\cdot)$ and m, Eq. (2) can be solved using standard optimization algorithms such as the one proposed Lee et al. in the article "Efficient Sparse Coding Algorithms" (Proc. 19th Annual Conference Neural Information Processing Systems, pp. 801-808, 2007), which is incorporated herein by reference. The selections of $D(\cdot)$ and m are explained next.

In a preferred embodiment of the present invention, the dissimilarity function $D(\cdot)$ uses a weighted-sequence distance algorithm such as that described by Wang et al. in the article "Human Activity Encoding and Recognition Using Low-level Visual Features" (Proceedings of the $21^{st}$ International Joint Conference on Artificial Intelligence, pp. 1876-1882, 2009), which is incorporated herein by reference. With this approach, a set of pre-defined operations are applied to change one of the arguments into the other. Examples of pre-defined operations include: substitution, insertion, and deletion. A dissimilarity value (i.e., a "weighted sequence distance") is determined by summing cost values associated with the application of the pre-defined operations.

The value of m controls the number of non-zero elements in α, which in turn controls the number of elements of the summary set of video frames 213. As explained later, the number of elements of the summary set of video frames 213 determines the time duration of the video summary 215. In a preferred embodiment of the present invention, the value of m is selected heuristically such that the time duration of the video summary 215 meets some pre-specified value set by the users. For applications where exact duration of the video summary 215 is not critical or cannot be specified, the value of m can be set to a pre-determined constant. Preferably, m should be chosen such that α contains non-zero weighting coefficients for less than 10% of the basis function.

The form video summary step 214 produces the video summary 215 using the elements of the summary set of video frames 213. The video summary 215 can be determined in any appropriate way known to those skilled in the art. In a preferred embodiment of the present invention, the video summary 215 is determined by arranging the video frames included in the summary set of video frames 213 in temporal order. In another embodiment of the present invention, only a subset of the video frames included in the summary set of video frames 213 corresponding to the largest weighting coefficients of α are included in the video summary 215. The largest weighting coefficients can be identified by comparing the weighting coefficients to a specified threshold, or by sorting the weighting coefficients and selecting a specified number or fraction of the weighting coefficients. In some embodiments, additional video frames can be included in the video summary to supplement the video frames included in the summary set of video frames 213. For example, the video frames corresponding to a short time interval surrounding each of the video frames in the summary set of video frames 213 can be included to smooth out any jumpiness in the appearance of video summary 215.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 user interface system
140 data storage system
202 receive input digital video step
203 input digital video
204 initialize intermediate digital video step
205 intermediate digital video
206 get global feature vector step
207 global feature vector
208 get video frames subset step
209 video frames subsets
210 get basis function set step
211 basis function set
212 get summary set of video frames step
213 summary set of video frames
214 form video summary step
215 video summary
302 extract video frame quality score step
303 video frame quality score set
304 determine frames subset size step
305 frames subset size
306 select group of frames step
402 form video frames clusters step
403 video frames clusters
404 select clusters subset step
405 clusters subset
406 select frames from clusters subset step
502 extract frame feature vector step
503 frame feature vectors set
504 extract frame features similarity step
505 frame features similarity values
506 generate clusters step
602 extract subset feature vector step
603 subset feature vectors set
604 determine basis function set step

The invention claimed is:

1. A method for determining a video summary from a video sequence including a time sequence of video frames, comprising:
   a) determining a global feature vector representing the entire video sequence;
   b) selecting a plurality of subsets of the video frames;
   c) determining a frame feature vector for each video frame in the selected subsets of video frames;
   d) defining a set of basis functions, wherein each basis function is associated with the frame feature vectors for the video frames in a particular subset of video frames;
   e) using a data processor to automatically determine a sparse combination of the basis functions representing the global feature vector;
   f) determining a summary set of video frames responsive to the sparse combination of the basis functions; and
   g) forming the video summary responsive to the summary set of video frames;
   wherein the sparse combination of the basis functions is determined by finding a sparse vector of weighting coefficients .alpha. by minimizing $D(y, A\alpha)$ subject to the constraint $||\alpha||_0 < m$, where y is the global feature vector, A is a matrix representation of the set of basis functions, $D(\circ)$ is a dissimilarity function which returns a number that represents the dissimilarity between its two arguments, m is the number of non-zero elements in α, $||\circ||_0$ denotes $l_0$ norm;
   wherein the video frames in the summary set of video frames corresponding to the largest weighting coefficients are merged in a manner that preserves the temporal order to form the video summary.

2. The method of claim 1 wherein the summary set of video frames are the video frames included in the subsets of video frames corresponding to the basis functions included in the sparse combination of basis functions.

3. The method of claim 1 wherein temporal order is preserved in the subsets of video frames.

4. The method of claim 1 wherein the subsets of the video frames are selected by randomly sampling video frames from the video sequence while preserving the temporal order.

5. The method of claim 1 wherein the video frames in the video sequence are clustered into groups of similar frames, and wherein the subsets of the video frames are selected based on the groups of similar frames.

6. The method of claim 1 wherein the video frames in the video sequence are analyzed to determine a quality score, and wherein video frames having higher quality scores are preferentially included in the subsets of the video frames.

7. The method of claim 6 wherein the quality score for a video frame is determined based on detecting the presence of one or more faces in the video frame, estimating a noise level for the video frame, or estimating a sharpness level for the video frame.

8. The method of claim 1 wherein the dissimilarity function applies a set of pre-defined operations to change one of its arguments into the other and determines a dissimilarity value by summing cost values associated with the application of the pre-defined operations.

9. The method of claim 1 wherein the pre-defined operations include substitution, insertion and deletion.

10. The method of claim 1 wherein the video frames in the summary set of video frames are merged in a manner that preserves the temporal order to form the video summary.

11. The method of claim 1 wherein the sparse combination of the basis functions is formed by determining weighting coefficients for each basis function, wherein only a minority of the weighting coefficients are non-zero.

12. The method of claim 11 wherein less than 10% of the weighting coefficients are non-zero.

13. The method of claim 11 wherein the number of non-zero weighting coefficients is selected to correspond to a specified time duration for the video summary.

* * * * *